T. R. GABEL & A. L. EACRETT.
TROLLEY RETRIEVER.
APPLICATION FILED FEB. 18, 1908.
913,122.
Patented Feb. 23, 1909.
3 SHEETS—SHEET 1.
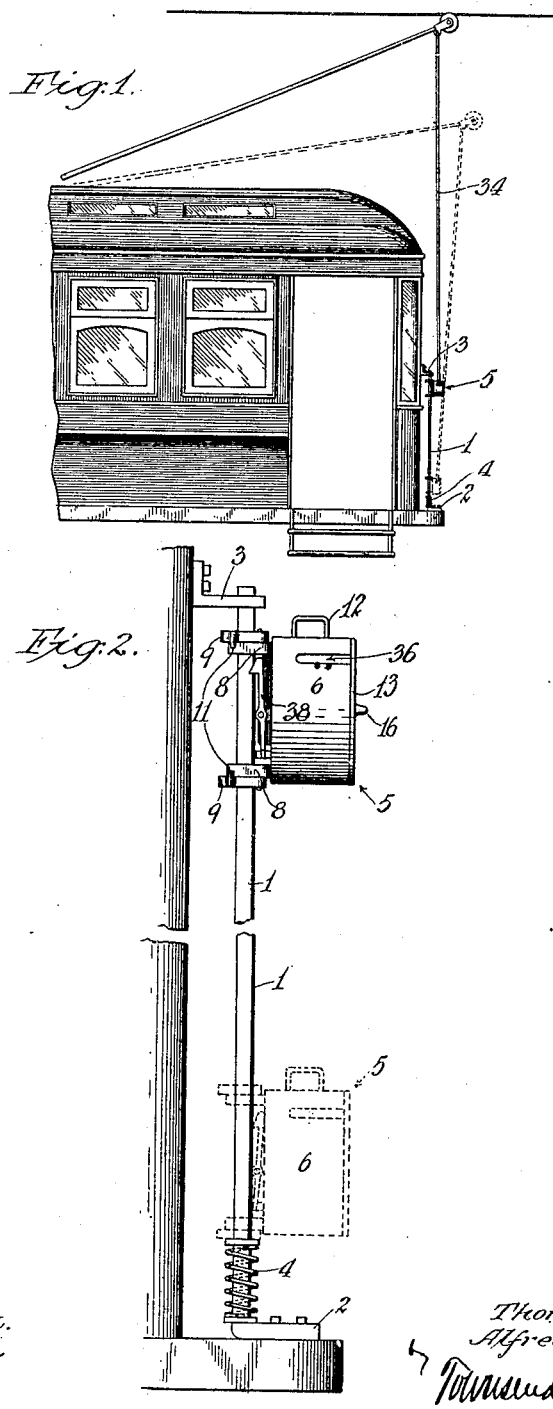

T. R. GABEL & A. L. EACRETT.
TROLLEY RETRIEVER.
APPLICATION FILED FEB. 18, 1908.
913,122.
Patented Feb. 23, 1909.
3 SHEETS—SHEET 2.
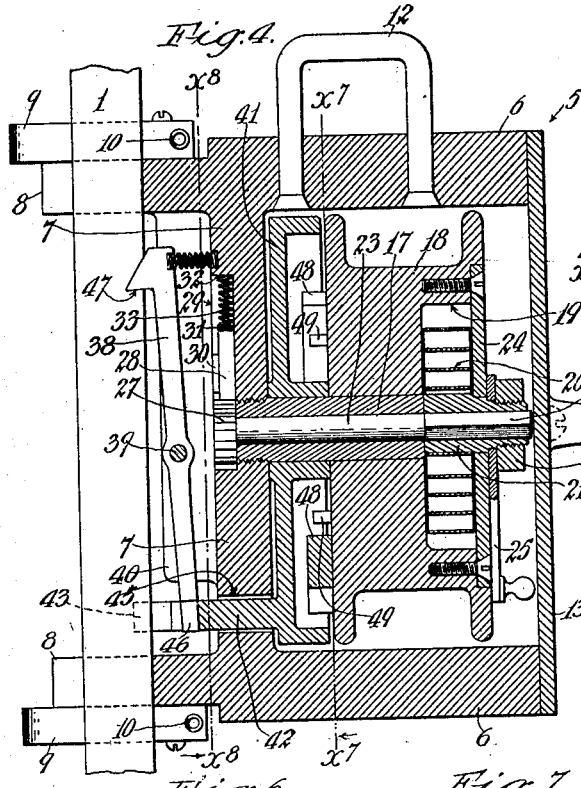
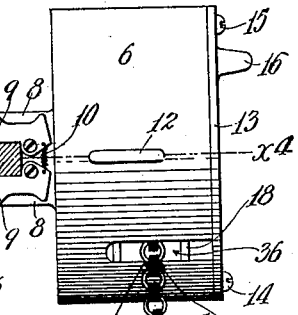
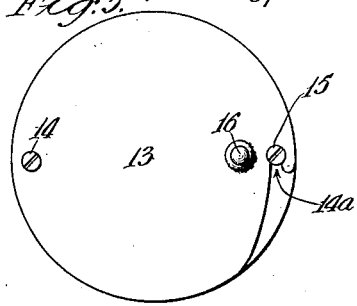
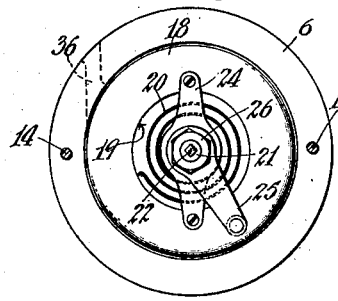
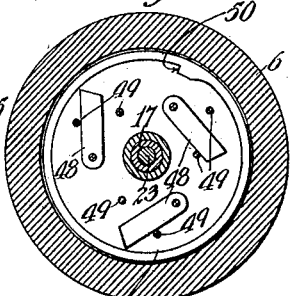
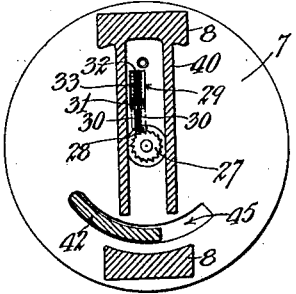
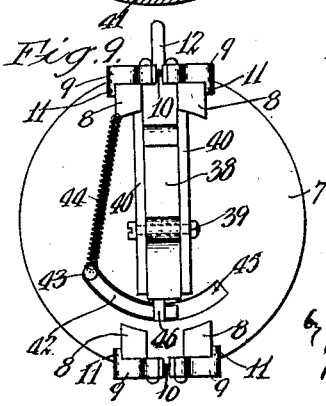

T. R. GABEL & A. L. EACRETT.
TROLLEY RETRIEVER.
APPLICATION FILED FEB. 18, 1908.
913,122.
Patented Feb. 23, 1909
3 SHEETS—SHEET 3.
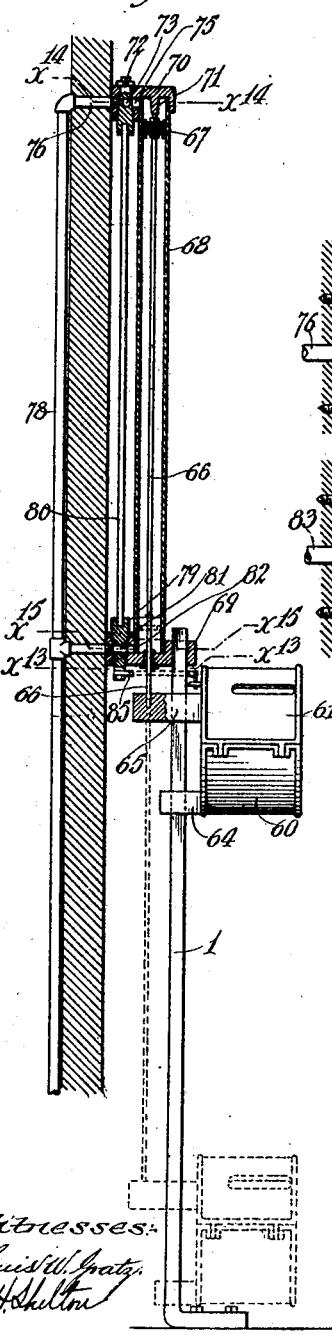
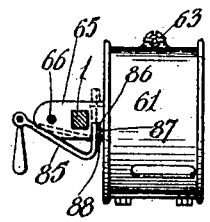
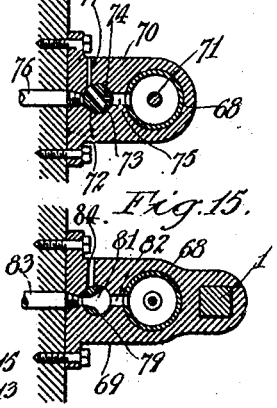
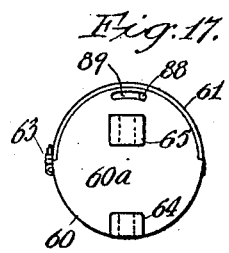
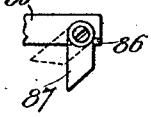
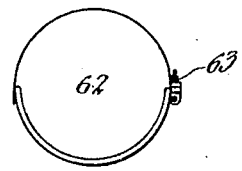
Inventors
Thomas R. Gabel
Alfred L. Eacrett

UNITED STATES PATENT OFFICE.

THOMAS R. GABEL, OF LOS ANGELES, AND ALFRED L. EACRETT, OF HOLLYWOOD, CALIFORNIA.

TROLLEY-RETRIEVER.

No. 913,122.　　　Specification of Letters Patent.　　　Patented Feb. 23, 1909.

Application filed February 18, 1908. Serial No. 416,617.

*To all whom it may concern:*

Be it known that we, THOMAS R. GABEL and ALFRED L. EACRETT, both citizens of the United States, the former residing at Los Angeles, in the county of Los Angeles, State of California, and the latter residing at Hollywood, in the county of Los Angeles, State of California, have invented a new and useful Trolley-Retriever, of which the following is a specification.

This invention relates to trolley retrievers and one of the main objects of the invention is to provide a trolley retriever which may be applied to any trolley car without requiring any change to be made in the trolley pole or trolley base.

Trolley retrievers have been constructed in which the trolley rope was automatically wound up on a reel to pull down the pole. The present invention includes a reel for taking up slack in the trolley rope, the pole is pulled down when the trolley jumps from the wire by the automatic bodily downward movement of the reel, the reel during this downward movement being locked against revoluble movement. This is the predominant feature of our device and so far as we are aware is broadly new. The advantages obtained by thus pulling down the pole are that the action upon the pole is much more direct; that the action is much more certain, in that springs are not relied upon for winding the rope to pull down the pole; that the device acts with greater rapidity and prevents the trolley from moving more than four or five inches above the wire before it is pulled down; that when the pole is lowered by the device, the pole is held in lowered position positively until reset; that the device is easily manipulated and the trolley can be replaced on the wire within a few seconds after having been dropped, which resetting can be accomplished while running at full speed without causing any loss of time; that the device can be detached from one end of the car and attached to the other end in a few seconds so that it is not actually necessary to employ two retrievers, one for each end of the car; and that the pole is pulled down from eighteen to twenty inches below the wire and does not rebound.

Only one class of mechanism is required in this retriever, that is to say, none of its working parts have to be altered to apply the retriever to various types of car, as the retriever can be applied in a few minutes to any electric trolley car and the device is immediately operative, no changes being required in the regular trolley base or trolley pole of the car.

Other advantages will be apparent from the following description.

Referring to the drawings:—Figure 1 is a side elevation of the rear portion of a trolley car equipped with one form of the device, the dotted lines showing the position of the device and trolley pole when dropped. Fig. 2 is an enlarged view of the device and its guide on the end of a car, the dotted lines showing the position of the device when dropped. Fig. 3 is a plan view of the device, the guide being shown in section. Fig. 4 is an enlarged section on line $x^4$—$x^4$ Fig. 3. Fig. 5 is a plan view of the rear face of the device. Fig. 6 is a plan view, on a reduced scale, of the rear of the device with the back cover removed. Fig. 7 is a section on line $x^7$—$x^7$ Fig. 4. Fig. 8 is a section on line $x^8$—$x^8$ Fig. 4. Fig. 9 is a plan view looking toward the inner face of the device. Fig. 10 is a perspective view, enlarged, of the sliding pawl. Fig. 11 is a sectional view through the cam plate. Fig. 12 is a side elevation, partly in section, showing another form of the invention in which the retriever is lowered by means of compressed air, the retriever being shown in normal position in full lines, dotted lines showing its position when lowered. Fig. 13 is a section on line $x^{13}$—$x^{13}$ Fig. 12. Fig. 14 is a section, on an enlarged scale, on line $x^{14}$—$x^{14}$ Fig. 12. Fig. 15 is a section, on an enlarged scale, on line $x^{15}$—$x^{15}$ Fig. 12. Fig. 16 is a detail, enlarged, of the swinging detent. Fig. 17 is a rear elevation of the retriever. Fig. 18 is a face view of the retriever.

A vertical guide bar 1 is secured to the end of the trolley car, as shown in Figs. 1 and 2, the lower end of bar 1 having a foot 2 which is bolted to the car, the upper end of the guide extending through a bracket 3 which is secured to the car. A coil buffer spring 4 is mounted at the bottom of the guide for arresting the retriever at the bottom of its drop.

Mounted to slide on the guide bar 1 is the trolley retriever, designated in general, 5 and comprising a cylindrical casing 6 having an integral wall 7, see Fig. 4. Two pair of lugs 8 extend from the wall 7, each pair of lugs straddling the guide bar 1. Pivoted to each pair of lugs is a pair of latches 9, as clearly shown in Fig. 3, which are normally held closed over the guide bar 1 by means of a coil spring 10. Each latch 9 has a stop 11 which strikes against the adjacent lug 8 so that when the retriever is removed from the guide bar 1 the latches 9 are held spaced apart so that they may be readily snapped over the guide bar 1 by simply pushing the retriever toward the guide. A handle 12 is provided at the upper part of the casing 6.

A ciruclar cover 13 is pivoted at 14 to the casing 6, as clearly shown in Fig. 5, the cover having a notch 14ª which is engaged by a stud 15 which holds the cover in position. The cover is provided with a knob 16 whereby it may be swung up on its pivot 14 to give access to the interior of the casing 6.

Screwed to the wall 7 is a hollow stationary shaft 17 on which is rotatably mounted a reel 18 having a recess 19 in which is arranged a spiral spring 20, the inner end of the spring being attached to a hub 21, the hub 21 being mounted on the squared end 22 of a shaft 23 which extends through the hollow shaft 17. The outer end of the spring 20 is attached to the reel 18 and the spring is inclosed by a plate 24 which is screwed to the reel 18, and plate 24 being journaled on the hub 21. A crank 25 is fixed to the hub 21 the latter being shouldered to receive the crank and a nut 26 is screwed on the end of the hub 21 against the crank 25. A ratchet 27 is fixed on the other end of the shaft 23 and is engaged by a sliding pawl 28, shown in detail in Fig. 10. The sliding pawl 28 slides in an elongated cavity 29 formed in the wall 7 and is retained in the cavity by two overhanging ledges 30, as shown in Figs. 4 and 8. The upper end of the pawl 28 has a stud 31 and a stud 32 is provided in the upper wall of the cavity 29, which studs serve to retain a coil spring 33, which presses against the upper end of the pawl 28 and holds it yieldingly against the ratchet 27. By swinging back cover 13 crank 25 may be turned to rotate hub 21 and the latter being fixed on the squared end 22 of the shaft 23 rotates the latter, pawl 28 and ratchet 27 preventing reverse movement of shaft 23, and as hub 21 is thus turned it winds up the spiral spring 20 to increase its tension. It will be understood, of course, that the reel 18 must be held against rotation when winding up the spring by means of crank 25 otherwise the reel 18 would revolve and the tension of spring 20 could not be increased by operating crank 25.

A trolley rope 34 is connected with the reel 18 through the medium of a chain 35 which passes through a slot 36 formed in the casing 6, as shown in Fig. 3, the chain passing with several turns around the reel 18 when the parts are in normal position. To hold the reel against turning when winding up the spring, as just described, the chain 35 may be dropped into engagement with two pins 37 on casing 6 as indicated in Fig. 3.

The retriever including the casing 6 and the parts carried thereby, is normally held at the top of the guide 1, as shown in Figs. 1, 2 and 4, by means of a detent 38 pivoted at 39 between two vertical flanges 40 which project from the wall 7, as shown in Figs. 4, 8 and 9. The reel 18 normally is capable of rotation in either direction, it permitting the trolley rope 34 to move outwardly against the tension of spring 20 as the trolley pole swings up, the reel being actuated in the opposite direction by spring 20 to take up slack in rope 34 as the trolley rides lower. Thus the spring controlled reel 18 always maintains the trolley rope 34 under tension sufficient to keep the slack up at all times. If the trolley makes a sudden upward movement, as, for example, by jumping from the wire or by reason of the wire breaking, means are provided for automatically locking the reel against rotation and for automatically releasing detent 38 to permit the retriever, as a whole, to drop down on the guide bar 1, so that as the retriever drops it pulls the trolley pole downward by reason of the reel 18 being locked against rotation. One form of means by which this may be accomplished comprises a cam plate 41, shown in detail in Fig. 11, which is rotatably mounted on the hollow shaft 17 between the reel 18 and the wall 7 and the cam plate 41 has a cam 42 projecting from its face with a lug 43 at one end of the cam 42 to which lug is attached a spring 44, the upper end of the spring being connected to one of the lugs 8, as shown in Fig. 9. The cam 42 projects through a segmental slot 45 in the wall 7 which slot limits the movement of cam 42 and the spring 44 normally holds cam 42, in the position shown in Fig. 9, with the lowest portion of the cam 42 in contact with a roller 46 arranged on the lower end of the detent 38 and when cam 42 is in this position the detent 38 engages in a notch 47 in guide bar 1 and holds the retriever in elevated position. Pivoted to the reel 18 are three dogs 48, the movement of each of which is limited by a pair of pins 49 which project from the reel 18. Projecting inwardly from the rim of the cam plate 41 is an abutment 50 against which any one of the dogs 48 is adapted to strike when moved out by centrifugal force owing to the abnormal turning speed of the reel 18 as caused by the sudden jumping of the trolley from the wire, while during the normal operation of the device the dogs clear the abutment 50 as there is not sufficient centrifugal force to throw any of them into engagement therewith, and each dog 48 drops by gravity below the abutment 50 as it approaches the abutment, as at that time the dog is at the top of its path of revolution, there being no springs required to control the dogs. When the trolley pole takes a quick upward movement by reason of the trolley jumping from the wire, the rapid rotation imparted to the reel 18 throws the dogs 48 outwardly and one of them strikes the abutment 50, thus causing the cam plate 41 to turn in unison with the reel 18 which causes the cam 42 to ride on roller 46 and tilt detent 38 and withdraw the detent from engagement with its notch 47 in guide 1, whereupon the casing 6 and all parts carried thereby drop by gravity down the guide 1, and as the turning movement of the reel 18 has been arrested by a dog 48 striking against the abutment 50 this locking of the reel causes it to pull down the trolley rope 34 as the retriever drops thereby drawing down the trolley pole into the position shown in dotted lines in Fig. 1. It should be understood that this action of locking the reel 18 and unlocking the detent 38 from its notch in guide 1 takes place almost instantaneously upon a sudden upward jerk of the rope, so that the pole is immediately pulled down. We have found in practice that the pole is not permitted to rise more than three or four inches above the trolley wire before it is pulled down below the wire, and thus all danger to the overhead structure or to the trolley pole is avoided. The buffer spring 4 cushions the retriever when it arrives at the bottom of the guide 1. To reset the retriever, after it has dropped, it is simply pulled up by means of handle 12 and the detent 38 engaged again with notch 47 and the trolley guided into the wire by manipulating the rope.

In the form just described the retriever is moved down by gravity, while in the form shown in Fig. 12, the retriever is moved down by compressed air when released. In this form, while the interior mechanism of the retriever proper is the same as in the preceding form, its casing is formed of a lower semi-cylindrical section 60 to which is hinged an upper semi-cylindrical section 61, the latter having a circular front plate 62, as shown in Fig. 18, which conforms to the contour of the lower section 60, and the section 60 has a circular plate 60ª which conforms to the contour of the upper section 61 so that when the upper section is closed it completely incloses the parts within the casing, and when open the interior parts are perfectly accessible for inspection or adjustment. The top section 61 is detachably fastened, when closed, to the lower section 60 by a swinging bolt and thumb nut 63. The plate 60ª has a lug 64 which slides on the vertical guide 1, and also has a longer lug 65 which is also slidably mounted on the guide 1 and is connected to a piston rod 66, the upper end of which has a piston 67 arranged in a vertical cylinder 68.

The lower end of cylinder 68 is screwed to a bracket 69 and its upper end is screwed to a bracket 70, the latter having a boss 71 which limits the upward movement of the piston 67. Mounted to rotate in the upper bracket 70 is a valve 72 which, as shown clearly in Fig. 14, has a diametrical passage 73 and a small passage 74 branching from passage 73. The bracket 70 is formed with a passage 75 which communicates with the interior of the cylinder 68 and intersects with the valve 72, a pipe 76 being connected to the other end of the passage 75. A small passage 77 is formed in the bracket 70 and leads from valve 72 to the atmosphere. A vertical pipe 78 is connected at its upper end with pipe 76, and the pipe 78 is supplied with air from the air brake system of the car, not shown. A valve 79 is mounted to turn in the lower bracket 69 and is connected by a shaft 80 with the valve 72, both valves being concentric and, when operated, are caused to turn in unison by the shaft 80. The valve 79 has a transverse passage 81, as clearly shown in Fig. 15, and the bracket 69 has a passage 82 which communicates with the interior of the cylinder 68, also intersects with the valve 79, and its other end communicates by means of a pipe 83 with the pipe 78. The bracket 69 is also formed with a large passage 84 which communicates with the atmosphere and extends to the valve 79. The lower end of valve 79 carries an arm 85, the arm being off-set to extend around the piston rod 66, and the arm 85 has an abutment 86 and carries a swinging detent 87 which normally rests against the abutment, but which detent is adapted to swing into the position shown in dotted lines in Fig. 16.

Extending from the cam plate 41, before described in the previous form, is a pin 88 which projects through a segmental slot 89 in the upper part of the disk shaped back wall 60ª of the lower section 60 of the casing, and under normal conditions, when the retriever stands at the top of the guide 1, pin 88 stands in front of the detent 87, so that when the cam plate is caused to turn, as previously described, by the sudden upward jump of the trolley pole, the pin 88 bearing against detent 87 and the latter in turn bearing against abutment 86 swings the arm 85 into the position shown in dotted lines in Fig. 13, thus turning valves 79 and 72 so that the passage 73 is brought into alinement with the passage 75, thus admitting air to the cylinder 68 above the piston 67, while valve 79 is turned so that its passage 81 brings passage 84 into communication with the lower end of the cylinder, at the same time shutting off communication between passage 82 and pipe 83 whereupon as air enters at the top of the cylinder above the piston and forces down the piston the air from the lower part of the cylinder below the piston is allowed to rush out quickly through the large passages 82 and 84, and as the piston is thus forced down it carries down the retriever with it, the parts taking the position shown in dotted lines Fig. 12, in which position they remain until the position of the valves is restored to normal, which restoration of the valves may readily be done by the conductor moving the lever 85 to normal position shown in full lines in Fig. 13, whereupon the valve 79 is turned to the position shown in Fig. 15 admitting air to the cylinder 68 below the piston which raises the piston and retriever carried thereby, and at the same time valve 73 is so turned that it assumes the normal position shown in Fig. 14. The air is allowed to escape gradually from the upper part of the cylinder by means of the small ports 74 and 77 which communicate with the passage 75, and thus the upward resetting movement of the retriever is accomplished gradually yet with sufficient rapidity, the object being to prevent undue abrupt upward movement, although in the downward movement it is advisable to have the movement take place more quickly. As the retriever nears its upper position, if the pin should stand in tripping position, or opposite to the position in which it is shown in Fig. 17, the pin, as the retriever rises, will strike the inclined lower end of the detent 87 and swing it into the position shown in dotted lines in Fig. 16, which permits the retriever to rise to its upper limit, after which, in turning the cam plate to restore it, the pin 88 rides under the end of the detent 87 and as soon as it clears the same the detent drops by gravity into its normal position back of the pin 88 and resting against the abutment 86.

What we claim is:—

1. A vertical guide, a casing slidable on the guide, a reel for the trolley rope in said casing, a detent pivoted to the casing and normally engaging a notch in said guide, a cam plate with a cam co-acting with the detent and normally free from the reel, and means operating upon a sudden turning of the reel to turn the cam plate in unison with the reel and thus operate the detent.

2. A vertical guide, a casing slidable on the guide, a reel for the trolley rope in said casing, a detent pivoted to the casing and normally engaging a notch in said guide, a cam plate with a cam co-acting with the detent and normally free from the reel, and means operating upon a sudden turning of the reel to turn the cam plate in unison with the reel and thus operate the detent and to lock the reel after it has operated the cam plate.

3. A vertical guide, a casing slidable on the guide, a reel for the trolley rope in said casing, a detent pivoted to the casing and normally engaging a notch in the guide, a cam plate with a cam co-acting with the detent, the cam plate having an abutment, and dogs carried by the reel and acting centrifugally to engage with said abutment upon a sudden turning movement of the reel.

4. A casing, a fixed hollow shaft in the casing, a reel for the trolley rope mounted to rotate on the hollow shaft, a solid shaft extending through the hollow shaft, a ratchet on the solid shaft, a pawl engaging the ratchet, a hub fixed on the solid shaft, said reel having a recess and a spiral spring therein, one end of the spring being attached to the reel and the other end to said hub, a plate on the reel inclosing the spring, a crank on the hub outside the plate, a vertical guide on which the casing is slidably mounted, a detent on the casing normally engaging the guide, and means operating upon a sudden turning movement of the reel for releasing said detent from the guide.

In testimony whereof, we have hereunto set our hands at Los Angeles, California, this 11th day of February 1908.

THOMAS R. GABEL.
ALFRED L. EACRETT.

In presence of—
GEORGE T. HACKLEY,
FRANK L. A. GRAHAM.